July 4, 1939.  B. J. BECKWITH  2,164,853
ALIGNER
Filed May 10, 1938   2 Sheets-Sheet 2
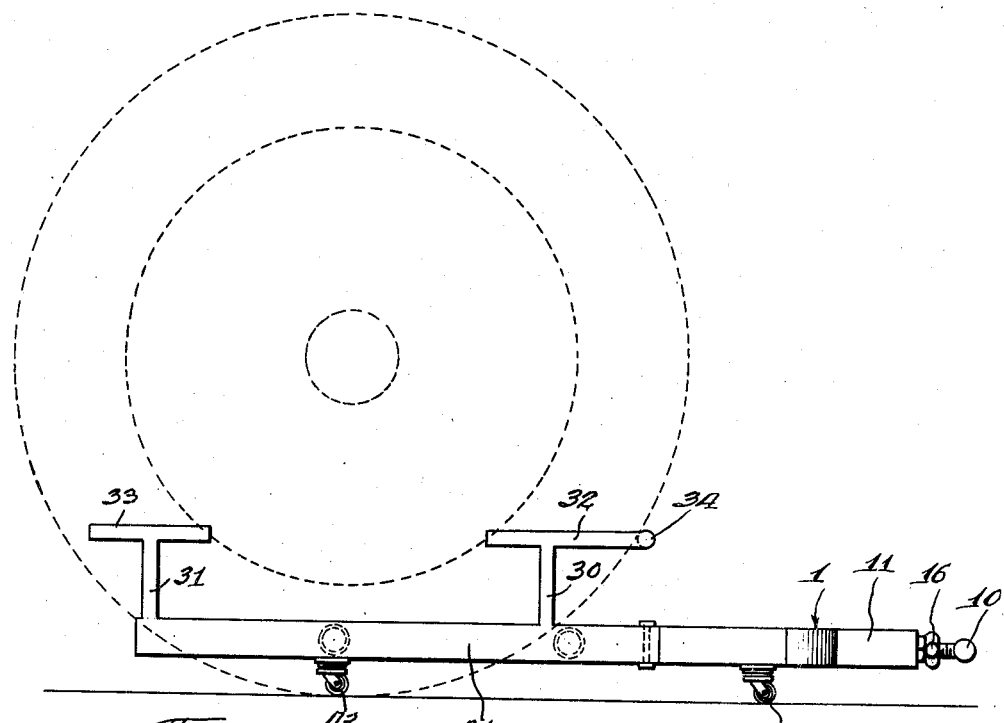
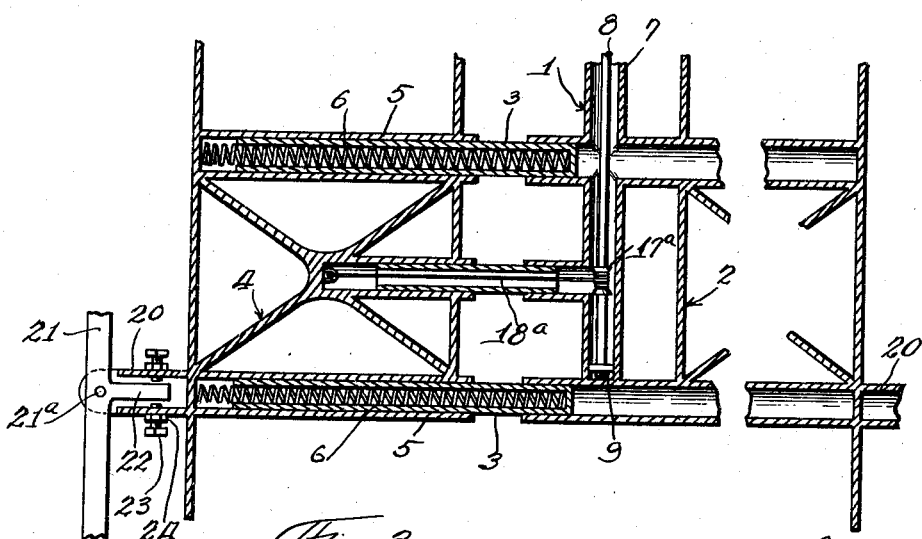

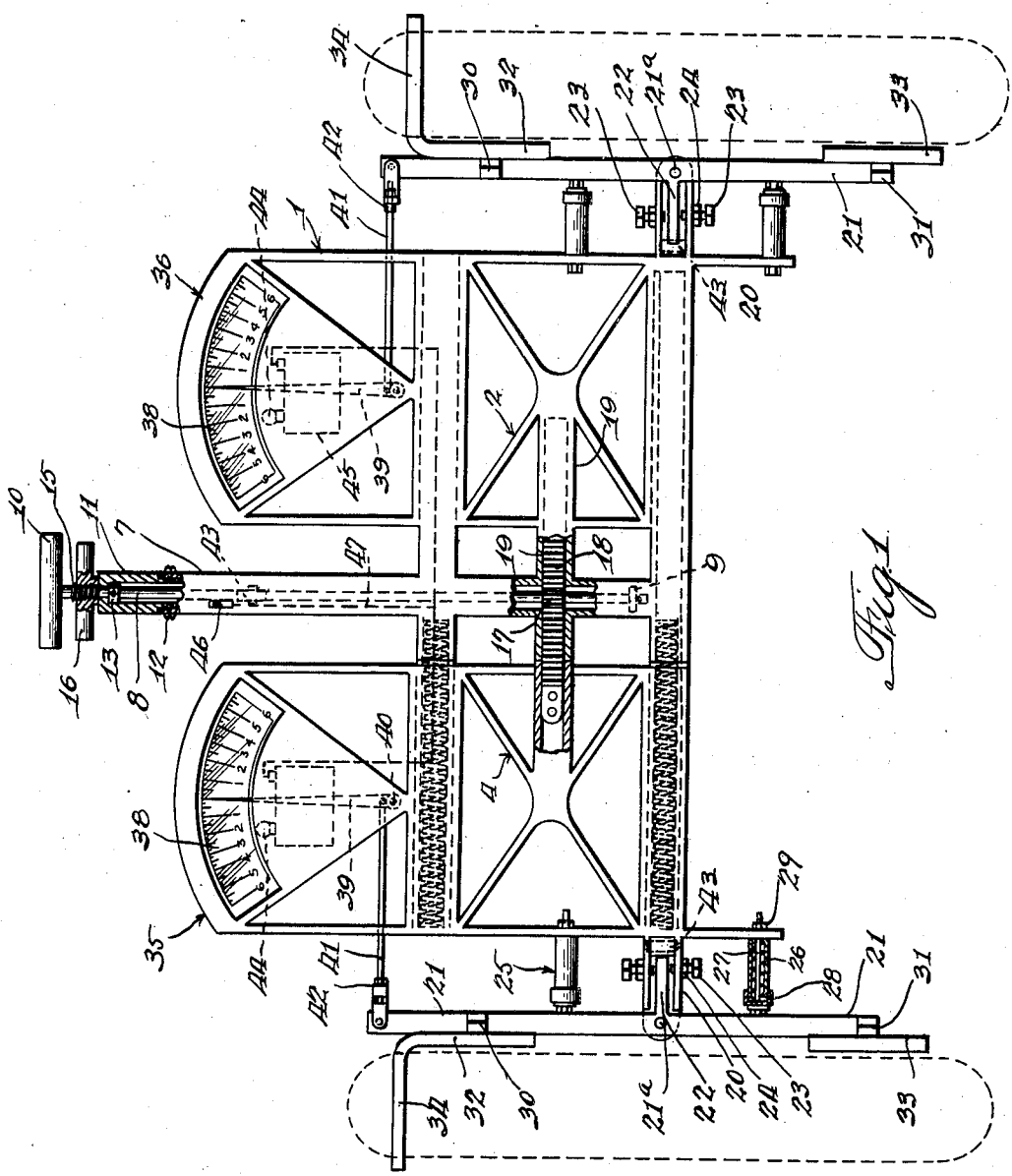

Patented July 4, 1939

2,164,853

UNITED STATES PATENT OFFICE 2,164,853

ALIGNER

Bernard J. Beckwith, Chicago, Ill., assignor to George H. Meiser, Chicago, Ill.

Application May 10, 1938, Serial No. 207,035

2 Claims. (Cl. 33—203)

This invention relates to aligners, and more particularly to means for aligning the wheels of automobiles. The device may be used for aligning either the back wheels or front wheels of an automobile and is particularly adapted to enable quick and accurate adjustment of the front wheels to provide a desired amount of so-called toe-in.

The front wheels of automobiles are preferably adjusted slightly angular to each other and to the axle in order to provide a desired amount of toe-in, which materially increases stability in driving. This adjustment is ordinarily very slight, but is extremely important, and it is usually very difficult accurately to adjust the wheels so that they will have the same relative angular relationship.

The present invention provides a small compact portable device preferably in the form of a so-called "coaster" by means of which it is possible to very quickly set the wheels in any desired relative angular relation, or they may be adjusted in accurate parallel relation as desired.

It is an object of the invention to provide a comparatively small, easily manipulated, portable device by which the necessary adjustments for wheel aligning may be made with a minimum amount of time and labor.

Another object is the provision of an aligner in the form of a small coaster which is easily portable and may be provided with direct reading indicators, preferably arranged to multiply the reading so that minute variations in angularity of either or both wheels may clearly and quickly be noted by the workman, also wherein either indicator may be adjusted to a zero reading and the total angularity of the wheels may be observed by direct reading of the other indicator.

It is also an object to provide a portable coaster for wheel aligning which requires a minimum amount of manipulation in order quickly to obtain an accurate reading of the angularity of automobile wheels and to obtain a direct continual reading during realignment of the wheels.

A further object is the provision of an aligning device which will be cheap to manufacture, easy to assemble, and which will not easily get out of order.

Further objects will be apparent from the specification and the appended claims.

In the drawings:

Fig. 1 is a top plan view of one embodiment of the invention and illustrates the coaster inserted between the wheels of an automobile with the wheels shown in dotted lines.

Fig. 2 is a side elevation of the embodiment illustrated in Fig. 1 as applied in aligning position with respect to automobile wheels.

Fig. 3 is a top view of the framework of a portion of the frame of the device, parts being shown in section for purposes of illustration.

Referring to the drawings in detail, the embodiment illustrated comprises a skeleton framework 1 which may be made at least partially of tubular members of any suitable cross sectional contour which will provide sufficient rigidity for the purpose. The framework 1 preferably comprises two relatively movable portions such as a rectangular subframe 2 having laterally extending tubular members 3 which are arranged to telescope into and support a second rectangular subframe 4 which is thereby maintained in alignment with the subframe 2 to provide an adjustable supporting frame for the entire structure. The tubular members 3 are arranged to telescope in corresponding tubular portions 5 of the subframe 4 and springs 6 are enclosed within the telescoping portions and normally tend to telescope the two portions of the frame outwardly.

The frame 2 is provided with a forwardly extending handle 7, which may also be made of any suitable tubular material. This handle extends forwardly to provide suitable means for moving the device and to support a control mechanism in an accessible position after the device is inserted between the wheels of an automobile.

A shaft 8 is rotatably mounted in the tubular handle 7 and is provided at its inner end with a bearing block 9 secured thereto and in which the shaft is rotatably supported. The block 9 may be removed or inserted with the shaft and is prevented from rotation by its engagement with the walls of the tube 7. The outer end of the shaft is provided with a handle 10 for rotation of the shaft and is secured to the tubular portion 7 by means of an extension 11 which may be secured to the tube 7 by means of suitable screws 12. The member 11 provides a cup-shaped bearing for supporting the outer end of the shaft 8 and the shaft is retained therein by means of a collar 13 secured to the shaft as illustrated. The outer portion of the shaft is threaded at 15 and a locking handle 16 is also threaded and mounted on the portion 15 so that, by tightening this locking handle, the shaft will be locked against rotation. The shaft 8 is provided adjacent its inner end with a pinion 17 in mesh with a rack 18 which is secured to or forms a part of the subframe 4 as shown in Fig. 1.

The free end of the rack 18 may extend through the handle and telescope into a tubular portion 19 of the subframe 2 as shown. It will be apparent that the springs 6 will tend to move the subframes apart when the pinion is released by loosening the lock handle 16 and that they may be drawn snugly together against the compression of the springs and locked as shown in Fig. 1, which illustrates the device in retracted and locked condition so that sufficient clearance is provided to permit easy insertion of the aligner between automobile wheels.

The construction illustrated in Fig. 3 is identical with that of Fig. 1 except that a spool 17a is provided instead of the pinion 17 and a cable 18a is substituted for the rack 18. The operation is the same in both structures.

Each of the subframes 2 and 4 is provided with oppositely disposed outwardly extending portions or brackets 20 which may be merely extensions of the tubular portions of the framework or may be provided in any suitable manner. A lever 21 is pivoted at 21a on each bracket 20. These levers are pivoted intermediate their ends and provided with rearwardly extending arms 22. Adjustable stop screws 23 are mounted on each bracket and provided with lock nuts 24 to maintain the stops in any desired adjusted position. These stops 23 limit the pivotal movement of the levers 20 as desired. The angular adjustment of automobile wheels is usually very slight so that it is unnecessary to allow any very great movement of the levers.

Each of the subframes 2 and 4 is also provided with a pair of resilient lever engaging members or equalizers 25. These equalizers may comprise a tubular casing having a spring 26 therein resting against the bottom of the casing and adjustably retained by means of a bolt 27 and a cap member 28. The equailizers may be adjusted by means of the nut 29. By this construction, resilient equalizers or bumpers are provided which may be compressed by pressure of the levers on the outer ends of the bolts 29. The levers are therefore permitted to automatically adjust themselves to the angle of any surface against which they may be pressed.

The levers 21 are provided, adjacent their opposite ends, with upwardly extending arms 30 and 31, respectively, and the upper ends of these arms are provided with out-turned elongated heads 32 and 33 for engaging the sides of an automobile wheel. The forward arms 30 are preferably also provided with lateral extensions 34 which provide stops for engaging the faces of the tires when the coaster is pushed underneath an automobile and between the wheels.

A housing 35 is mounted on or may form a part of the subframe 4 and a similar housing 36 is mounted on the subframe 2, as illustrated. These may be comparatively shallow housings and are rigidly supported and, of course, are movable with their respective sections. The housings 35 and 36 extend forwardly of the framework as illustrated in Fig. 1, and the forward end of each housing is provided with a window 37, under which is positioned a suitable scale 38. An elongated needle 39 is pivoted at 40 within each housing and arranged to operate over its corresponding dial 38. The needle 39 is connected to the outer end of its associated adjacent lever 21 by means of a link 41 having a threaded adjustment 42 associated therewith so that the needle may normally be adjusted to zero or to any desired position relationship.

The device is preferably mounted on suitable casters 43 which may be positioned underneath the frame and secured thereto at the points indicated in Figs. 1 and 2.

In the usual wheel aligning device, many complicated operations are required, and it is necessary to take scale readings for each wheel and divide these readings and then carefully adjust the wheels to a desired reading for each scale. The complications necessary in such manipulations make for inaccuracy in the final adjustment. The present invention is constructed to provide extremely accurate adjustment of the wheel with a minimum expenditure of time and it is only necessary after the final setting of the device to adjust the tie rod of the automobile to provide the desired toe-in as indicated on only one of the reading dials.

In operation, the subframes are first retracted by operation of the shaft 8 in the manner previously described and are then locked in this retracted position by means of the locking nut 16. The coaster may then be inserted between the wheels of an automobile in the manner illustrated in Figs. 1 and 2, and the shaft 8 released, whereby the levers 20 are moved outwardly into engagement with the automobile wheels. By means of the forwardly extending handle, the device may then be moved slightly to adjust one of the needles 39, preferably the left-hand one, which is on the side of the steering post, to zero position. The needle on the right-hand side will then indicate the total angular relationship of the wheels and the tie rod between the wheels may then be adjusted until a desired angular relationship is obtained and the reading during adjustment may be entirely taken from the right-hand dial with the left-hand dial retained at zero.

The required toe-in is ordinarily very, very slight and, therefore, the present invention is preferably adapted for only a comparatively slight movement of the levers 21. The dial, therefore, may be very large relative to the wheel adjustment, and in the present instance the entire range of the dial is preferably adapted to indicate only one-half inch movement of the outer end of its associated lever 20. That is, the range on each side of zero will correspond to only one-fourth inch of lever movement. It is, therefore, possible with the structure described to clearly read on the multiplying scale variations in angular adjustment as small as $\frac{1}{64}$ inch. A suitable ratio of lever movement to scale reading is one to twelve.

In order to properly illuminate the dials, suitable electric sockets may be mounted in the casings 35 and 36 in a position to support light bulbs 44 to illuminate the dials 38. The sockets may be grounded to the frame in the usual manner and the other terminal connected to a battery 45. The opposite terminal of each battery may be grounded by means of any suitable electric switch 46. The switch is preferably mounted on the handle, as shown, and connected to the batteries by a suitable conductor 47.

Modifications may be made without departing from the spirit of the invention, and it is desired, therefore, that the invention be limited only by the prior art and the scope of the appended claims.

Having thus described this invention, what is claimed and desired to be secured by Letters Patent is:

1. A portable coaster aligner for automobile wheels comprising a framework supported on casters, said framework comprising two laterally relatively movable sub-frames having telescoping portions adapted to hold said frames in alignment in all positions of adjustment, resilient means tending to separate said frames, a lever pivoted intermediate its ends adjacent the outer edge of each sub-frame, resilient means operative between each lever and its associated frame and normally tending to hold said levers parallel with each other and with the median plane of said coaster, a two direction from zero indicator on each sub-frame and operatively connected to its associated lever to indicate angular lever deviation from normal in either direction, a forwardly extending rotatable shaft on one sub-frame and substantially on the median line of said coaster, a handle on said shaft for moving said coaster and operable for rotary movement of said shaft, and a transmission between said shaft and the other sub-frame and constructed to retract said framework when said handle is rotated.

2. A portable coaster aligner for automobile wheels comprising a framework supported on castors, said framework comprising two laterally relatively movable sub-frames having telescoping portions adapted to hold said frames in alignment in all positions of adjustment, resilient means tending to separate said frames, a lever pivoted intermediate its ends adjacent the outer edge of each sub-frame, resilient means operative between each lever and its associated frame and normally tending to hold said levers parallel with each other and with the median plane of said coaster, said last mentioned resilient means comprising a compression spring on each side of the pivot of each lever and between each lever and its associated sub-frame and limiting means for each spring, whereby only one spring is effective in either direction of movement of its associated lever from parallelism, a two direction from zero indicator on each sub-frame and operatively connected to its associated lever to indicate angular lever deviation from normal in either direction, a forwardly extending rotatable shaft on one sub-frame and substantially on the median line of said coaster, a handle on said shaft for moving said coaster and operable for rotary movement of said shaft, a transmission between said shaft and the other sub-frame for retracting said framework by rotation of said handle, and means to lock said framework in retracted position.

BERNARD J. BECKWITH.